(12) United States Patent
Higurashi

(10) Patent No.: US 7,471,795 B2
(45) Date of Patent: Dec. 30, 2008

(54) INFORMATION TRANSMISSION SYSTEM

(75) Inventor: Seiji Higurashi, Fuchu (JP)

(73) Assignee: Victor Company of Japan, Ltd., Yokohama (JP)

( * ) Notice: Subject to any disclaimer, the term of this patent is extended or adjusted under 35 U.S.C. 154(b) by 938 days.

(21) Appl. No.: 10/880,708

(22) Filed: Jul. 1, 2004

(65) Prior Publication Data

US 2005/0058293 A1    Mar. 17, 2005

(30) Foreign Application Priority Data

Sep. 12, 2003   (JP) .............................. 2003-322162

(51) Int. Cl.
*H04N 7/167* (2006.01)
*H04L 9/00* (2006.01)
*H04K 1/00* (2006.01)

(52) U.S. Cl. .................. 380/274; 380/204; 380/224; 380/225; 380/260; 380/262

(58) Field of Classification Search .................. 380/204, 380/224, 225, 260, 262, 274
See application file for complete search history.

(56) References Cited

U.S. PATENT DOCUMENTS

| | | | | |
|---|---|---|---|---|
| 4,893,339 A * | 1/1990 | Bright et al. | .................. | 380/28 |
| 5,506,905 A * | 4/1996 | Markowski et al. | ......... | 380/262 |
| 6,590,981 B2 * | 7/2003 | Fruehauf et al. | ............ | 380/260 |
| 6,914,637 B1 * | 7/2005 | Wolf et al. | .................. | 348/473 |
| 7,027,384 B2 * | 4/2006 | Ohbi et al. | ............... | 369/275.3 |
| 7,206,411 B2 * | 4/2007 | Olivier et al. | ............... | 380/262 |
| 7,242,772 B1 * | 7/2007 | Tehranchi | .................... | 380/223 |
| 2004/0085445 A1 * | 5/2004 | Park | ........................... | 348/143 |
| 2004/0268117 A1 * | 12/2004 | Olivier et al. | ............... | 713/150 |

OTHER PUBLICATIONS

Japanese book *Modern Cipher* *, Tatsuaki Okamoto et al. Jun. 30, 1997. *English explanation of the portions submitted is given in the specification of the instant application.

* cited by examiner

*Primary Examiner*—Kristine Kincaid
*Assistant Examiner*—James Turchen
(74) *Attorney, Agent, or Firm*—Louis Woo

(57) ABSTRACT

A sending apparatus generates a first initial vector, a second initial vector, and an encryption key in response to a pseudo random number. Original information is encrypted into cipher information in response to the encryption key and the second initial vector. The cipher information and the first initial vector are transmitted from the sending apparatus to a receiving apparatus. The receiving apparatus generates a first initial vector, a second initial vector, and an encryption key in response to a pseudo random number equal to that in the sending apparatus. The cipher information is decrypted back to the original information in response to the generated encryption key and the generated second initial vector. The receiving apparatus compares the received first initial vector and the generated first initial vector to check whether or not encryption/decryption-related synchronization between the sending apparatus and the receiving apparatus is normally maintained.

14 Claims, 9 Drawing Sheets

INFORMATION TRANSMISSION SYSTEM

BACKGROUND OF THE INVENTION

1. Field of the Invention

This invention generally relates to an information transmission system. This invention particularly relates to a system for transmitting digital information while keeping it secret. In addition, this invention relates to a method of transmitting cipher information.

2. Description of the Related Art

In a conventional digital-information transmission system, digital data (digital information) to be transmitted is processed into a prescribed transmission format before being actually transmitted. Specifically, the digital data is divided into equal-size segments. A sync signal is added to the head of every data segment while a parity signal is added to the end thereof. The sync signal is designed for the identification of the first bit in the data segment. The parity signal is designed for the detection of an error or errors in the data segment. A set of the sync signal, the data segment, and the parity signal is a prescribed transmitted-signal unit block. In this way, the digital data to be transmitted is converted into a sequence of unit blocks inclusive of sync signals and parity signals. The sequence of unit blocks is transmitted.

During the transmission of a signal of the above-mentioned format, anyone can tap digital data in the transmitted signal if the signal format is disclosed.

For keeping transmitted digital data secret, it is usual to encrypt the digital data before the transmission thereof. The DES (Data Encryption Standard) is a typical method of encrypting digital information. According to the DES, digital information to be transmitted is encrypted in response to an encryption key on a block-by-block basis where every block has 64 bits. Similarly, a receiver side decrypts incoming information in response to a decryption key on a block-by-block basis. The encryption key in a sender side and the decryption key in the receiver side are the same. In the case where one bit in digital information encrypted by the DES changes to an error during the transmission, the 1-bit error causes a receiver side to conclude the whole of a block inclusive of the 1-bit error, that is, 64 bits inclusive of the 1-bit error, to be wrong since the block-by-block decryption is implemented therein. Thus, the DES tends to decrease the error correction capability.

Japanese book entitled "Modern Cipher", written by Tatsuaki Okamoto and Hirosuke Yamamoto, published by Sangyo-Tosho Kabushikikaisha on Jun. 30, 1997, pages 73-75, discloses an output feedback (OFB) mode of the DES. The DES-OFB mode is usually employed for the transmission of digital information via a transmission line apt to cause bit errors. In the DES-OFB mode, encryption is used to generate keystream blocks. Specifically, an encryptor changes every input block into a keystream block according to the DES. The generated keystream block is fed back to the input side of the encryptor, and is used as a next input block. Thus, every keystream block is generated by encrypting the last one according to the DES. As a result, every keystream block corresponds to a pseudo random number. The generated keystream blocks are XORed with information blocks to get concealed information (cipher information) to be transmitted.

In such encryption-based information transmission systems, it is necessary that an encryption key is transmitted between an information sending side and an information receiving side, and is held in common by them. Generally, authentication or certification necessitating complicated calculations is used as a portion of a procedure of implementing the high-security transmission of an encryption key and enabling an information sending side and an information receiving side to hold the encryption key in common. Thus, the encryption-based information transmission systems require calculation devices of large circuit scales for performing the authentication or the certification. The calculations for the authentication or the certification take a relatively long time. For enhancing the security of transmitted information, it is usual to frequently and synchronously update encryption keys in an information sending side and an information receiving side. Generally, authentication or certification necessitating complicated calculations is used as a portion of a procedure of synchronously updating the encryption keys in the information sending side and the information receiving side.

In the DES-OFB mode, an initial value for an input block is changed to alter a scramble pattern or an encryption pattern in each of an information sending side and an information receiving side. For security, authentication or certification necessitating complicated calculations is generally used as a portion of a procedure of synchronously changing the initial values in the information sending side and the information receiving side.

SUMMARY OF THE INVENTION

It is a first object of this invention to provide an inexpensive information transmission system which can synchronously update encryption keys in an information sending side and an information receiving side.

It is a second object of this invention to provide an information transmission system which implements encryption for high security of transmitted information.

It is a third object of this invention to provide an information transmission system having a relatively simple structure and being able to dispense with complicated calculations.

It is a fourth object of this invention to provide an improved method of transmitting cipher information.

A first aspect of this invention provides an information transmission system comprising a sending apparatus for sending a composite signal including a first sync signal, a second sync signal, and encryption-resultant information, the first sync signal repetitively occurring at a first predetermined period, the second sync signal repetitively occurring at a second predetermined period shorter than the first predetermined period, wherein a plurality of the second sync signals are present in one period of the first sync signal in the composite signal; and a receiving apparatus for receiving the composite signal from the sending apparatus, for detecting the first sync signal and the second sync signal in the received composite signal, and for decrypting the encryption-resultant information in the received composite signal. The sending apparatus comprises first means for implementing a first shifting action synchronously with the second sync signal to generate a first pseudo random number signal, and for suspending the first shifting action synchronously with the first sync signal during a first prescribed time interval; second means for generating a first initial value in response to the first pseudo random number signal generated by the first means; third means separate from the second means for generating a second initial value in response to the first pseudo random number signal generated by the first means; fourth means for generating a first encryption key in response to the first pseudo random number signal generated by the first means, the first encryption key being updated synchronously with the second sync signal; fifth means for encrypting original information into the encryption-resultant information in response to the first encryption key generated by the fourth means and the second initial value generated by the third means; sixth means for generating a combination-resultant signal inclusive of the first sync signal, the second sync signal, and the encryption-resultant information; and seventh means for combining the first initial value generated by the second means with the combination-resultant signal during the first prescribed time interval for which the first shifting action of the first means is suspended to get the composite signal. The receiving apparatus comprises eighth means for implementing a second shifting action, equal to the first shifting action, synchronously with the detected second sync signal to generate a second pseudo random number signal equal to the first pseudo random number signal, and for suspending the second shifting action synchronously with the detected first sync signal during a second prescribed time interval corresponding to the first prescribed time interval; ninth means for generating a third initial value normally equal to the first initial value in response to the second pseudo random number signal generated by the eighth means; tenth means separate from the ninth means for generating a fourth initial value equal to the second initial value in response to the second pseudo random number signal generated by the eighth means; eleventh means for generating a second encryption key equal to the first encryption key in response to the second pseudo random number signal generated by the eighth means, the second encryption key being updated synchronously with the detected second sync signal; twelfth means for detecting the first initial value in the received composite signal; thirteenth means for comparing the first initial value detected by the twelfth means and the third initial value generated by the ninth means to check a synchronization between the sending apparatus and the receiving apparatus; and fourteenth means for decrypting the encryption-resultant information in the received composite signal in response to the second encryption key generated by the eleventh means and the fourth initial value generated by the tenth means.

A second aspect of this invention is based on the first aspect thereof, and provides an information transmission system wherein the first sync signal comprises a vertical sync signal; the second sync signal comprises a horizontal sync signal; the first means comprises means for suspending the first shifting action during the first prescribed time interval including a first blanking area after the occurrence of the vertical sync signal, and means for implementing the first shifting action synchronously with the second sync signal during a first data area interval after the first blanking area to generate the first pseudo random number signal; the second means comprises means for generating the first initial value at a moment of the occurrence of the horizontal sync signal in the first blanking area; the third means comprises means for updating the second initial value synchronously with the second sync signal during the first data area interval; the fourth means comprises means for updating the first encryption key synchronously with the second sync signal during the first data area interval; the fifth means comprises means for encrypting the original information into the encryption-resultant information during the data area interval; the eighth means comprises means for suspending the second shifting action during the second prescribed time interval including a second blanking area after the occurrence of the detected vertical sync signal, and means for implementing the second shifting action synchronously with the detected second sync signal during a second data area interval after the second blanking area to generate the second pseudo random number signal, the second blanking area corresponding to the first blanking area, the second data area interval corresponding to the first data area interval; the ninth means comprises means for generating the third initial value at a moment of the occurrence of the detected horizontal sync signal in the second blanking area; the tenth means comprises means for updating the fourth initial value synchronously with the detected second sync signal during the second data area interval; the eleventh means comprises means for updating the second encryption key synchronously with the detected second sync signal during the second data area interval; and the fourteenth means comprises means for decrypting the encryption-resultant information in the received composite signal during the second data area interval.

A third aspect of this invention is based on the first aspect thereof, and provides an information transmission system wherein the composite signal has a data area interval occurring synchronously with the first sync signal and containing the encryption-resultant information, and the eighth means comprises means for detecting a total number of times the detected second sync signal occurs during the data area interval related to the received composite signal, means for subtracting the detected total number from a predetermined number to get a subtraction result, and means for implementing the second shifting action a number of times equal to the subtraction result during the next second prescribed time interval.

A fourth aspect of this invention provides a method of transmitting cipher information from an information sending apparatus to an information receiving apparatus. The information sending apparatus includes a first linear feedback shift register. The information receiving apparatus includes a second linear feedback shift register equal in structure to the first linear feedback shift register. The method comprises the steps of loading the first linear feedback shift register and the second linear feedback shift register with a same set of value-representing bits in common; generating a first encryption key in response to value-representing bits held by the first linear feedback shift register; encrypting an original video signal in response to the first encryption key to get a cipher video signal; shifting a set of value-representing bits held by the first linear feedback shift register to update the first encryption key for every horizontal line represented by the original video signal in an effective scanning interval related thereto; using a value represented by value-representing bits held by the first linear feedback shift register at a first timing of a prescribed horizontal line in every 1-frame interval or every 1-field interval related to the original video signal as a first authentication value; combining the cipher video signal and the first authentication value to get a composite signal inclusive of the cipher video signal and the first authentication value; transmitting the composite signal from the information sending apparatus to the information receiving apparatus; generating a second encryption key equal to the first encryption key in response to value-representing bits held by the second linear feedback shift register; shifting a set of value-representing bits held by the second linear feedback shift register to update the second encryption key in accordance with the updating of the first encryption key; decrypting the cipher video signal in the composite signal transmitted from the information sending apparatus in response to the second encryption key to recover the original video signal in the information receiving apparatus; using a value represented by value-representing bits held by the second linear feedback shift register at a second timing corresponding to the first timing as a second authentication value; detecting the first authentication value in the composite signal transmitted from the information sending apparatus; and checking whether or not the information sending apparatus and the information receiving apparatus have a same authentication value in common in response to the detected first authentication value and the second authentication value for every frame or every field.

A fifth aspect of this invention is based on the fourth aspect thereof, and provides a method further comprising the steps of detecting a total number of times a set of value-representing bits held by the second linear feedback shift register is shifted during a predetermined later time area in every frame or every field; subtracting the detected total number from a predetermined number to get a subtraction result; and shifting a set of value-representing bits held by the second linear feedback shift register a number of times equal to the subtraction result during a predetermined former time area in the next frame or the next field.

A sixth aspect of this invention is based on the fourth aspect thereof, and provides a method wherein the checking step comprises deciding whether the detected first authentication value and the second authentication value are equal or different to check whether or not the information sending apparatus and the information receiving apparatus have a same authentication value in common, and further comprising the step of reloading the first linear feedback shift register and the second linear feedback shift register with the same set of value-representing bits in common when it is decided that the detected first authentication value and the second authentication value are different.

A seventh aspect of this invention is based on the fourth aspect thereof, and provides a method wherein the checking step comprises comparing the detected first authentication value and the second authentication value to check whether or not the information sending apparatus and the information receiving apparatus have a same authentication value in common.

An eighth aspect of this invention provides an information transmission system comprising a first linear feedback shift register holding a multi-bit signal and outputting the held multi-bit signal; first means for driving the first linear feedback shift register to implement a bit shift of the multi-bit signal held by the first linear feedback shift register and thereby updating the multi-bit signal outputted therefrom in response to every horizontal sync signal in an input video signal during a predetermined data area of every frame or field represented by the input video signal; second means for encrypting video data in the input video signal in response to the multi-bit signal outputted from the first linear feedback shift register to change the input video signal into a first cipher video signal; third means for generating a first initial vector signal in response to the multi-bit signal which is outputted from the first linear feedback shift register at a prescribed timing relative to every frame or field represented by the input video signal; fourth means for combining the first cipher video signal and the first initial vector signal into a second cipher video signal, and outputting the second cipher video signal; a second linear feedback shift register holding a multi-bit signal and outputting the held multi-bit signal; fifth means for receiving the second cipher video signal outputted from the fourth means, and detecting every horizontal sync signal in the received second cipher video signal; sixth means for driving the second linear feedback shift register to implement a bit shift of the multi-bit signal held by the second linear feedback shift register and thereby updating the multi-bit signal outputted therefrom in response to every horizontal sync signal detected by the fifth means during the predetermined data area of every frame or field represented by the received second cipher video signal; seventh means for decrypting video data in the received second cipher video signal in response to the multi-bit signal outputted from the second linear feedback shift register to reproduce the input video signal; eighth means for generating a second initial vector signal in response to the multi-bit signal which is outputted from the second linear feedback shift register at the prescribed timing relative to every frame or field represented by the received second cipher video signal; ninth means for detecting the first initial vector signal in the received second cipher video signal; tenth means for deciding whether the detected first initial vector signal and the generated second initial vector signal are equal or different; and eleventh means for, when the tenth means decides that the detected first initial vector signal and the generated second initial vector signal are different, synchronously resetting the first and second linear feedback shift registers to their initial states in which the first and second linear feedback shift registers hold and output a same predetermined initial multi-bit signal.

A ninth aspect of this invention is based on the eighth aspect thereof, and provides an information transmission system wherein the sixth means comprises means for compensating for a failure to detect a horizontal sync signal or signals in the fifth means during the predetermined data area of every frame or field represented by the received second cipher video signal.

A tenth aspect of this invention provides an information transmission system comprising a sending apparatus for encrypting an input information signal into an encryption-resultant information signal, and for sending the encryption-resultant information signal, wherein the input information signal contains a plurality of different types of sync signals; and a receiving apparatus for receiving the encryption-resultant information signal from the sending apparatus, and for decrypting the received encryption-resultant information signal. The sending apparatus comprises first means for generating an encryption key depending on the type of current one of the sync signals in the input information signal; and second means for encrypting the input information signal in response to the encryption key generated by the first means to get the encryption-resultant information signal. The receiving apparatus comprises third means for detecting the type of current one of the sync signals in the received encryption-resultant information signal; fourth means for generating a decryption key depending on the type detected by the third means; and fifth means for decrypting the received encryption-resultant information signal in response to the decryption key generated by the fourth means.

An eleventh aspect of this invention provides an information sending apparatus comprising a first memory storing a first encryption key; a second memory storing a second encryption key different from the first encryption key; first means for detecting every horizontal sync signal of either a first type or a second type in an input information signal, the first and second types differing from each other; second means for deciding whether the horizontal sync signal detected by the first means is of the first type or the second type; a selector for accessing the first memory to select the first encryption key when the second means decides that the horizontal sync signal detected by the first means is of the first type, and for accessing the second memory to select the second encryption key when the second means decides that the horizontal sync signal detected by the first means is of the second type, wherein the selector continues to access the first memory until the second means decides that the horizontal sync signal detected by the first means is of the second type, and continues to access the second memory until the second means decides that the horizontal sync signal detected by the first means is of the first type; third means for encrypting the input information signal in response to the encryption key selected by the selector; fourth means for detecting every vertical sync signal in the input information signal; and fifth means for updating the encryption key in one of the first and second memories which is not accessed by the selector each time the fourth means detects a vertical sync signal in the input information signal.

A twelfth aspect of this invention is based on the eleventh aspect thereof, and provides an information sending apparatus further comprising sixth means for replacing horizontal sync signals in an original information signal with horizontal sync signals of the first and second types to convert the original information signal into the input information signal.

A thirteenth aspect of this invention provides an information receiving apparatus comprising a first memory storing a first encryption key; a second memory storing a second encryption key different from the first encryption key; first means for detecting every horizontal sync signal of either a first type or a second type in a received information signal, the first and second types differing from each other; second means for deciding whether the horizontal sync signal detected by the first means is of the first type or the second type; a selector for accessing the first memory to select the first encryption key when the second means decides that the horizontal sync signal detected by the first means is of the first type, and for accessing the second memory to select the second encryption key when the second means decides that the horizontal sync signal detected by the first means is of the second type, wherein the selector continues to access the first memory until the second means decides that the horizontal sync signal detected by the first means is of the second type, and continues to access the second memory until the second means decides that the horizontal sync signal detected by the first means is of the first type; third means for decrypting the received information signal in response to the encryption key selected by the selector; fourth means for detecting every vertical sync signal in the received information signal; and fifth means for updating the encryption key in one of the first and second memories which is not accessed by the selector each time the fourth means detects a vertical sync signal in the received information signal.

This invention has advantages mentioned below. According to this invention, a sending apparatus uses first and second sync signals. The sending apparatus implements a shifting action synchronously with the second sync signal to generate a pseudo random number signal, and suspends the shifting action synchronously with the first sync signal during a prescribed time interval. An encryption key, a first initial value, and a second initial value are generated in response to the pseudo random number signal. The encryption key is updated synchronously with the second sync signal. Original information is encrypted into cipher information in response to the encryption key and the second initial value. The first sync signal, the second sync signal, and the cipher information are combined into a combination-resultant signal. Further, the first initial value is combined with the combination-resultant signal during the prescribed time interval for which the shifting action is suspended. As a result, a composite signal to be transmitted is generated. It is unnecessary for the sending apparatus to transmit the encryption key and the second initial value. Therefore, a high signal transmission efficiency can be provided. Since the encryption key is updated synchronously with the second sync signal, information transmitted can be concealed to a high degree.

Preferably, one way function is used to generate the first initial value from the pseudo random number. In this case, even if an illegal attempt to steal the first initial value has succeeded, it is difficult to compute the second initial value and the encryption key from the stolen first initial value.

According to this invention, a pseudo random number signal generated in a sending apparatus and a pseudo random number signal generated in a receiving apparatus are the same. The sending apparatus encrypts original information in response to the generated pseudo random number signal. The encryption-resultant information (the cipher information) is transmitted from the sending apparatus to the receiving apparatus. The receiving apparatus decrypts the received encryption-resultant information in response to the generated pseudo random number signal. Thus, large portions of the sending apparatus and the receiving apparatus can be formed by equal circuits. Therefore, the sending apparatus and the receiving apparatus can be inexpensive.

According to this invention, a receiving apparatus receives a composite signal inclusive of a first initial value from a sending apparatus. The receiving apparatus detects the first initial value in the received composite signal. The receiving apparatus has a portion for generating a first initial value corresponding to the first initial value generated in the sending apparatus. The receiving apparatus compares the detected first initial value and the generated first initial value to check whether or not encryption/decryption-related synchronization between the sending apparatus and the receiving apparatus is normally maintained. Thus, it is possible to implement the secure transmission of information.

According to this invention, a composite signal received by a receiving apparatus has a data area interval occurring synchronously with a first sync signal and containing encryption-resultant information. The data area interval follows a prescribed time interval synchronous with the first sync signal. The receiving apparatus has a portion for generating a pseudo random number signal by implementing a shifting action. This portion is also designed for detecting a total number of times a detected second sync signal occurs during the data area interval, for subtracting the detected total number from a predetermined number to get a subtraction result, and for implementing the shifting action a number of times equal to the subtraction result during the next prescribed time interval. Thus, the number of times the shifting action is implemented can be corrected to a normal value which occurs in the absence of a failure to detect a second sync signal or signals in the data area interval. Therefore, it is possible to compensate for a failure to detect a second sync signal or signals in the data area interval which would break encryption/decryption-related synchronization between a sending apparatus and the receiving apparatus.

DETAILED DESCRIPTION OF THE INVENTION

First Embodiment

Figure 1:
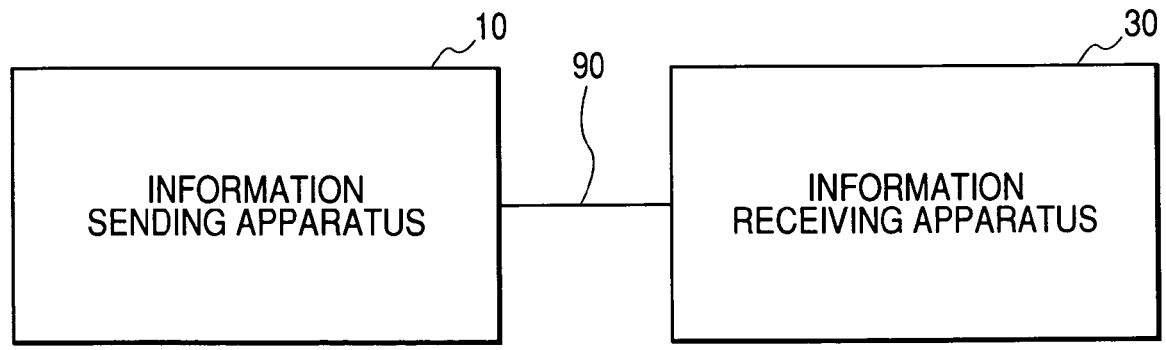
FIG. 1 is a block diagram of an information transmission system according to a first embodiment of this invention.

FIG. 1 shows an information transmission system according to a first embodiment of this invention. The information transmission system of FIG. 1 includes an information sending apparatus 10 and an information receiving apparatus 30 which are bidirectionally connected via a transmission line 90. The transmission line 90 may contain a communication network or a spatial transmission medium.

The information sending apparatus 10 outputs an information signal to the transmission line 90. The information signal propagates along the transmission line 90 before reaching the information receiving apparatus 30. The information receiving apparatus 30 receives the information signal from the transmission line 90.

Figure 2:
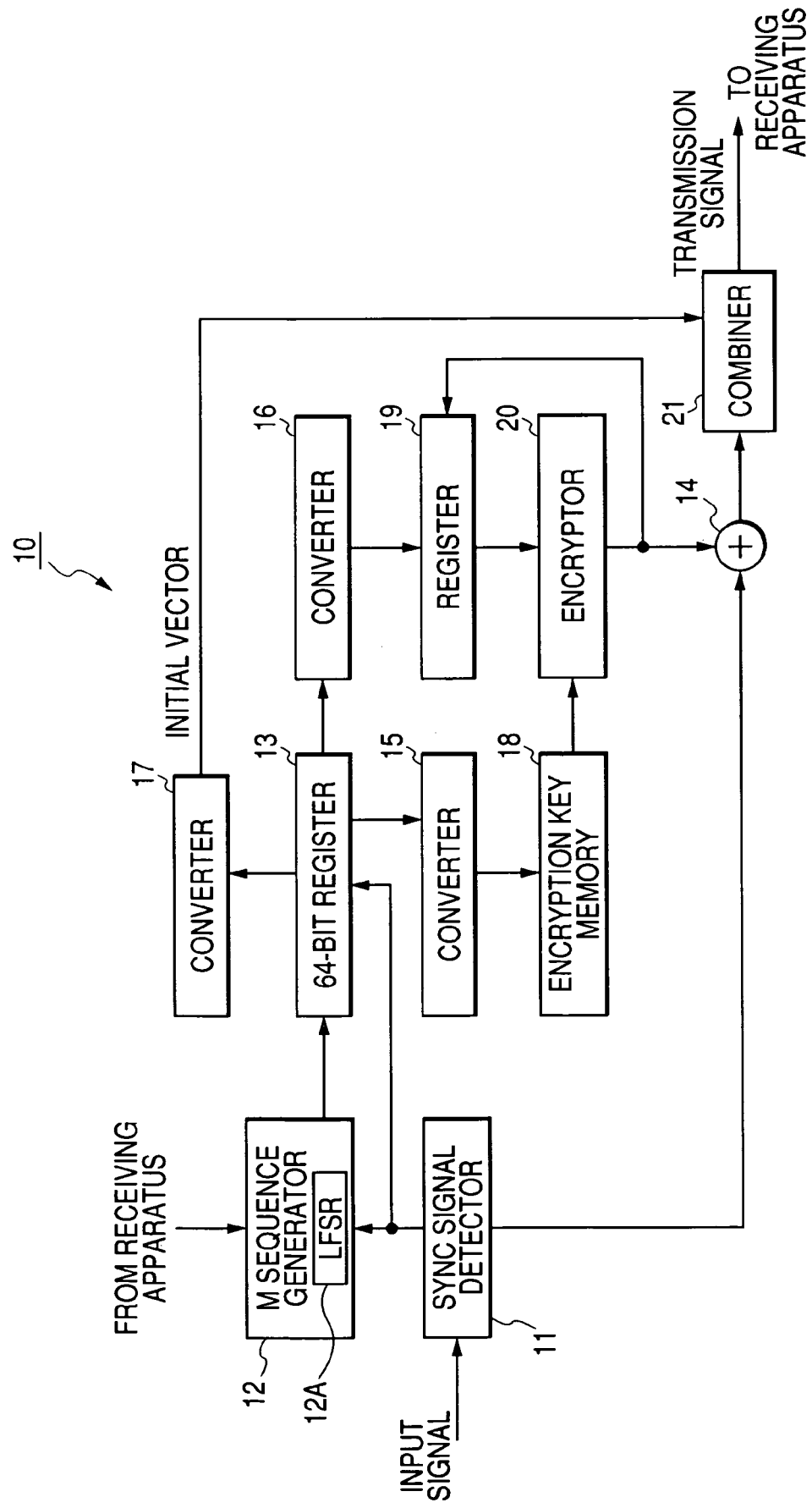
FIG. 2 is a block diagram of an information sending apparatus in FIG. 1.

As shown in FIG. 2, the information sending apparatus 10 includes a sync signal detector 11, a maximum length sequence generator (an M sequence generator) 12, a 64-bit register 13, an adder (a modulo-2 adder) 14, converters 15, 16, and 17, a memory 18, a register 19, an encryptor 20, and a combiner 21.

The sync signal detector 11 is connected with the M sequence generator 12, the 64-bit register 13, and the adder 14. The M sequence generator 12 leads from the information receiving apparatus 30 via the transmission line 90. The M sequence generator 12 is connected with the 64-bit register 13. The 64-bit register 13 is connected with the converters 15, 16, and 17. The adder 14 is connected with the encryptor 20 and the combiner 21. The converter 15 is connected with the memory 18. The converter 16 is connected with the register 19. The converter 17 is connected with the combiner 21. The memory 18 is connected with the encryptor 20. The register 19 is connected with the encryptor 20. The combiner 21 leads to the information receiving apparatus 30 via the transmission line 90.

An input signal to be transmitted is fed to the sync signal detector 11. The input signal is of a known video or television format, and represents a sequence of frames or fields each scanned on a line-by-line basis. Every 1-frame segment or every 1-field segment of the input signal is divided into a blanking part void of picture data (video data) and a data part following the blanking part and including picture data. Accordingly, the input signal includes horizontal sync signals, vertical sync signals, blanking signals, and stream data such as video data. The device 11 detects every horizontal sync signal and every vertical sync signal in the input signal. Each time a horizontal sync signal is detected, the sync signal detector 11 feeds the M sequence generator 12 and the 64-bit register 13 with a signal representing the detection of the horizontal sync signal. The signal representing the detection of the horizontal sync signal is referred to as the horizontal sync detection signal. Each time a vertical sync signal is detected, the sync signal detector 11 feeds the M sequence generator 12 and the 64-bit register 13 with a signal representing the detection of the vertical sync signal. The signal representing the detection of the vertical sync signal is referred to as the vertical sync detection signal. The sync signal detector 11 passes the input signal to the adder 14.

The M sequence generator 12 includes a random number generator (a pseudo random number signal generator) using a linear feedback shift register (LFSR) 12A which holds a set of bits representative of a value equal to an initial value or a pseudo random number, and which can either implement or suspend a shifting action on the held bit set. During a blanking area (a blanking time area) after the moment of the reception of every vertical sync detection signal from the sync signal detector 11, the M sequence generator 12 continues to suspend the shifting action. Thus, the M sequence generator 12 suspends the shifting action synchronously with the vertical sync signal. After the blanking area, the M sequence generator 12 implements a 1-bit shift of the held bit set each time a horizontal sync detection signal comes from the sync signal detector 11. Thus, the M sequence generator 12 implements a 1-bit shift synchronously with the horizontal sync signal. At an initial stage, the M sequence generator 12 is in a standby state (an initial state) where the M sequence generator 12 or the LFSR 12A therein is loaded with a multi-bit signal representing a preliminarily-transmitted or predetermined initial value. In accordance with the bits held by the LFSR 12A, the M sequence generator 12 produces a maximum length sequence, that is, a multi-bit signal representing a pseudo random number. After the blanking area, the M sequence generator 12 implements a 1-bit shift and hence updates the pseudo random number signal each time a horizontal sync detection signal comes from the sync signal detector 11. The M sequence generator 12 outputs the pseudo random number signal to the 64-bit register 13.

The 64-bit register 13 samples and holds the output signal from the M sequence generator 12 and simultaneously feeds the held signal to the converters 15, 16, and 17 in response to every horizontal sync detection signal fed from the sync signal detector 11. The converter 15 changes the value represented by the signal fed from the 64-bit register 13 to a first value according to a first predetermined one way function. The converter 16 changes the value represented by the signal fed from the 64-bit register 13 to a second value according to a second predetermined one way function. The converter 17 changes the value represented by the signal fed from the 64-bit register 13 to a third value according to a third predetermined one way function. The first, second, and third values differ from each other. The converter 15 feeds a signal representative of the first value to the memory 18. The first-value signal is stored in the memory 18 as a signal representing an encryption key of the DES (Data Encryption Standard).

The signal fed from the 64-bit register 13 to the converter 17 which occurs at the moment of the reception of the final horizontal sync detection signal in the blanking area is specially handled as follows. The value represented by this signal is used as an authentication or certification value and is converted by the converter 17, and a signal representative of the conversion result value is fed from the converter 17 to the combiner 21 as a signal representative of a frame-related or field-related initial vector (initial value).

The blanking area is followed by a data area interval assigned to the transmission of stream data. During the data area interval, the M sequence generator 12 implements a 1-bit shift and the signal fed from the 64-bit register 13 to the converter 16 changes in accordance with the 1-bit shift each time a horizontal sync detection signal comes from the sync signal detector 11. During the data area interval, the value represented by the signal fed from the 64-bit register 13 is converted by the converter 16, and a signal representative of the conversion result value is fed from the converter 16 to the register 19 as a signal representative of a 1H-related initial vector (initial value). The signal fed from the converter 16 is stored in the register 19.

The register 19, the encryptor 20, and the adder 14 compose an encryption circuit of the OFB (output feedback)

mode. The signal representative of the 1H-related initial vector is fed from the register 19 to the encryptor 20 as a first word. The signal representative of the encryption key is fed from the memory 18 to the encryptor 20. The device 20 encrypts the first word in response to the encryption key. The encryptor 20 outputs the encryption result to the adder 14, and feeds the encryption result back to the register 19 as a second word. The register 19 stores the second word, and feeds the second word to the encryptor 20. The device 20 encrypts the second word in response to the encryption key. The encryptor 20 outputs the encryption result to the adder 14, and feeds the encryption result back to the register 19 as a third word. Such a sequence of operation steps is iterated until the data area interval terminates.

The adder 14 executes Exclusive-OR operation (XOR operation) between the input signal fed from the sync signal detector 11 and the output signal from the encryptor 20, and thereby encrypts the input signal in response to the output signal from the encryptor 20 to get a cipher signal in which signal portions except horizontal and vertical sync signals and blanking signals are encrypted. The adder 14 feeds the cipher signal to the combiner 21. The combiner 21 multiplexes the cipher signal and the frame-related initial vector signal (or the field-related initial vector signal) from the converter 17 on a time sharing basis to get a multiplexing-resultant signal to be transmitted which is referred to as a transmission signal or an information signal. The combiner 21 outputs and sends the information signal (the transmission signal) toward the information receiving apparatus 30 via the transmission line 90.

Preferably, the combiner 21 includes an error check code generator. The error check code generator divides the information signal into 1H (one horizontal scanning period) segments in response to horizontal sync signals therein or horizontal sync detection signals outputted from the sync signal detector 11. The error check code generator produces a signal representative of a parity in response to each 1H segment, and adds the parity signal to the end of the 1H segment. Thus, the error check code generator converts the information signal into a parity-added information signal (a parity-added transmission signal). The combiner 21 outputs and sends the parity-added information signal toward the information receiving apparatus 30 via the transmission line 90.

It should be noted that the error check code generator may be provided at a location separate from the combiner 21.

As previously mentioned, the sync signal detector 11 receives the input signal and detects every horizontal sync signal and every vertical sync signal therein. The detection of every vertical sync signal results in the detection of the head of every frame or every field represented by the input signal. During a blanking area (a blanking time area) following or starting from every vertical sync signal, the M sequence generator 12 continues to suspend the shifting action. The suspension of the shifting action responds to every vertical sync detection signal fed from the sync signal detector 11 which indicates the detection of every vertical sync signal, that is, the detection of the head of every frame or every field.

Figure 3:
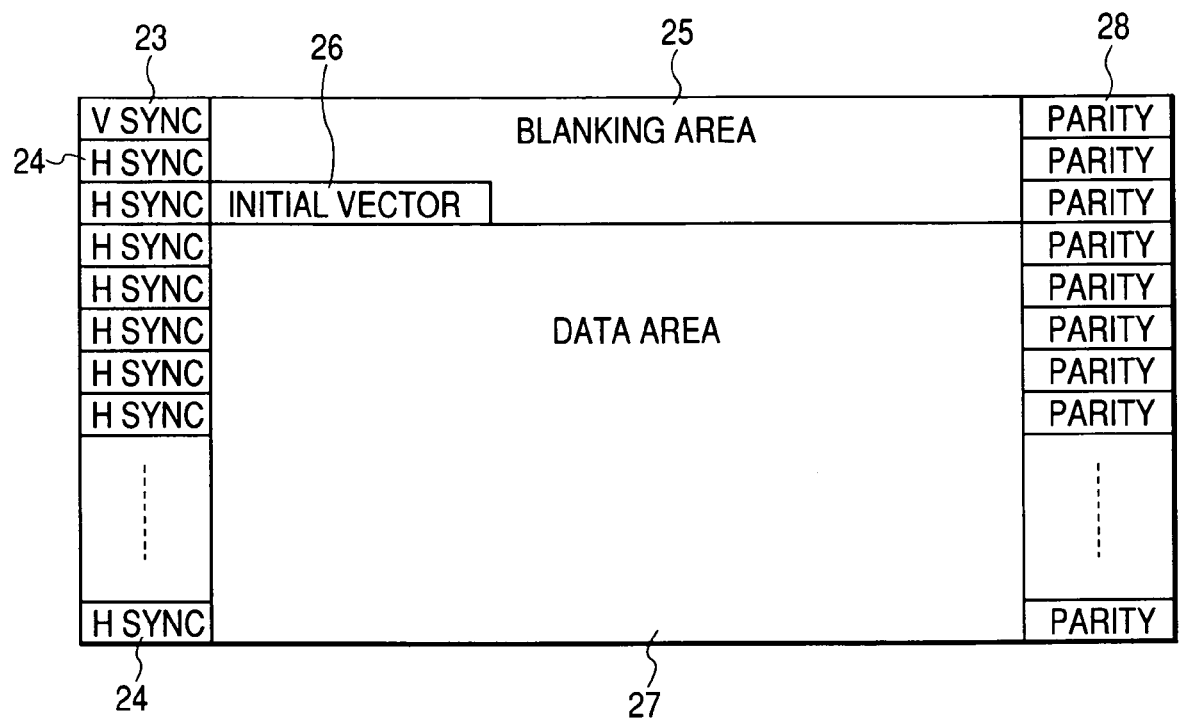
FIG. 3 is a diagram of the format taken by an information signal transmitted in the information transmission system of FIG. 1.

FIG. 3 shows a format taken by every 1-frame corresponding portion (or every 1-field corresponding portion) of the information signal outputted from the combiner 21. The large rectangle in FIG. 3 denotes the 1-frame corresponding portion (or the 1-field corresponding portion) of the information signal which is formed by a fixed number of 1H segments thereof. As shown in FIG. 3, the head of the 1-frame corresponding portion of the information signal is occupied by a vertical sync signal 23. A blanking area 25 follows the vertical sync signal 23. In FIG. 3, horizontal rows composing the large rectangle denote 1H segments of the information signal, respectively. A predetermined number of successive 1H segments starting from the first one are assigned to the blanking area 25. The heads of the 1H segments except the first one are occupied by horizontal sync signals 24, respectively. The ends of the 1H segments are occupied by parity signals 28, respectively. A frame-related initial vector signal (or a field-related initial vector signal) 26 outputted from the converter 17 follows the final horizontal sync signal 24 in the blanking area 25. Therefore, the final horizontal sync signal 24 in the blanking area 25 can be used as a position indicator for the frame-related initial vector signal (or the field-related initial vector signal) 26. A prescribed number of successive 1H segments subsequent to ones for the blanking area 25 are assigned to a data area (a data area interval) 27 following the blanking area 25. Thus, the same prescribed number (the normally total number) of horizontal sync signals 24 are assigned to the data area 27. The 1H segments assigned to the data area 27 are loaded with cipher stream data. A set of the blanking area 25 and the data area 27 forms a 1-frame interval (or a 1-field interval).

The cipher stream data in the data area 27 results from the previously-mentioned encryption by the adder 14. For every 1H interval (every horizontal sync signal interval or every horizontal scanning line interval) in the data area 27, the M sequence generator 12 implements a 1-bit shift in response to the horizontal sync signal 24 at the head, and the signal fed from the 64-bit register 13 to the converters 15 and 16 changes in accordance with the 1-bit shift. The 1H-related initial vector represented by the signal outputted from the converter 16 to the register 19 in the OFB-mode encryption circuit changes as the signal fed from the 64-bit register 13 to the converter 16 changes. Also, the encryption key represented by the signal outputted from the converter 15 changes as the signal fed from the 64-bit register 13 to the converter 15 changes. Accordingly, for every 1H interval in the data area 27, the 1H-related initial vector and the encryption key inputted to the OFB-mode encryption circuit are updated. Thus, for every 1H interval in the data area 27, the encryption result outputted from the encryptor 20 in the OFB-mode encryption circuit is updated.

As understood from the above explanation, the cipher stream data in the data area 27 results from the encryption responsive to the encryption key which varies from 1H interval to 1H interval. The frame-related initial vector signal (or the field-related initial vector signal) 26 outputted from the converter 17 is placed in the blanking area 25. The frame-related initial vector signal 26 can be used by the information receiving apparatus 30 for a decision concerning encryption/decryption-related synchronization. Every 1-frame corresponding portion (or every 1-field corresponding portion) of the information signal sent from the information sending apparatus 10 toward the information receiving apparatus 30 has cipher stream data in the data area 27, and has a frame-related initial vector signal (or a field-related initial vector signal) 26 in the blanking area 25. Neither the encryption key nor an initial value (a first word) for the encryption circuit is transmitted from the information sending apparatus 10 toward the information receiving apparatus 30.

The information receiving apparatus 30 is basically similar in structure to the information sending apparatus 10.

Figure 4:
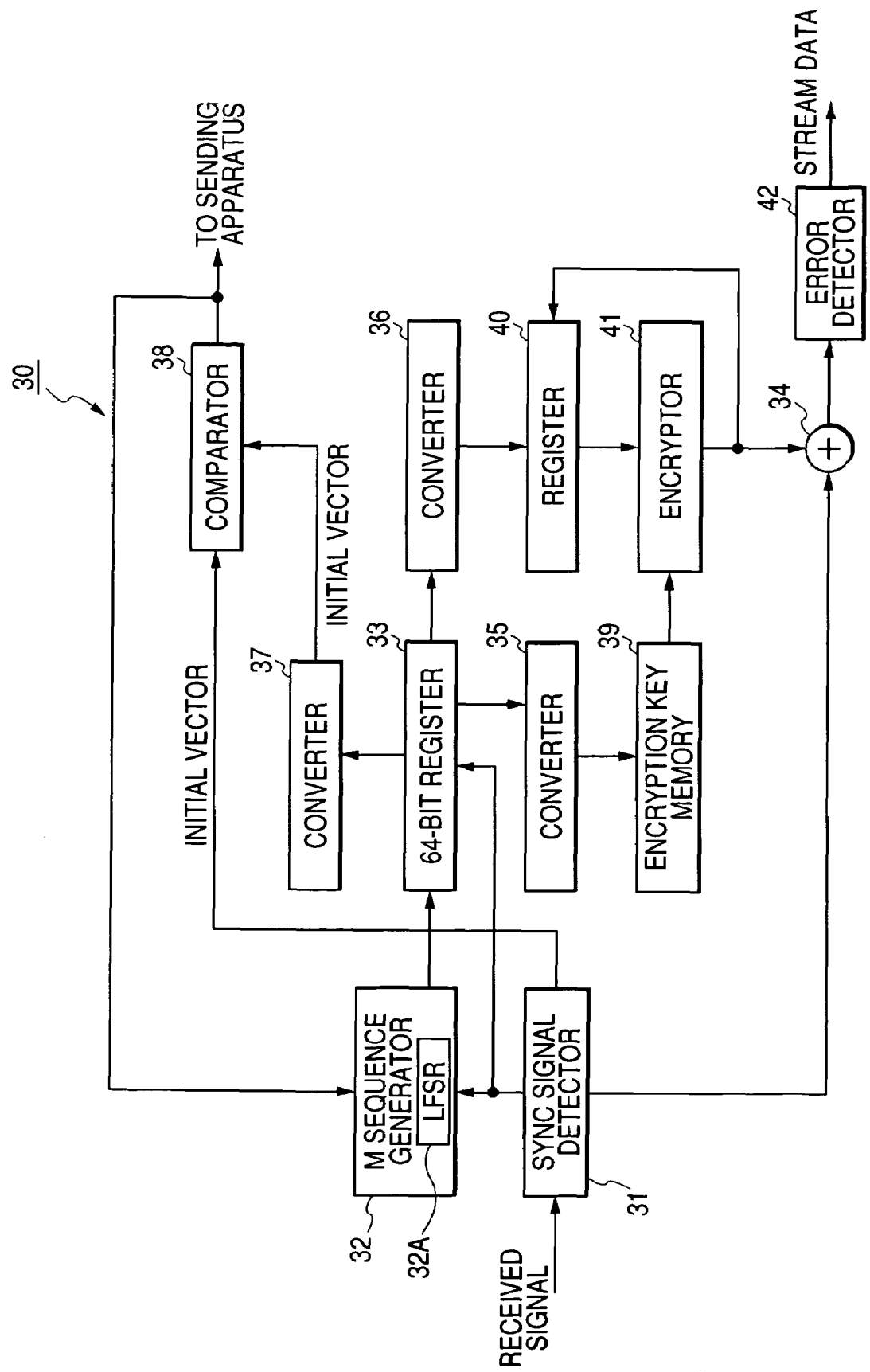
FIG. 4 is a block diagram of an information receiving apparatus in FIG. 1.

As shown in FIG. 4, the information receiving apparatus 30 includes a sync signal detector 31, a maximum length sequence generator (an M sequence generator) 32, a 64-bit register 33, an adder (a modulo-2 adder) 34, converters 35, 36, and 37, a comparator 38, a memory 39, a register 40, an encryptor 41, and an error detector 42.

The sync signal detector 31 leads from the information sending apparatus 10 via the transmission line 90. The sync signal detector 31 is connected with the M sequence generator 32, the 64-bit register 33, the adder 34, and the comparator 38. The M sequence generator 32 is connected with the 64-bit register 33 and the comparator 38. The 64-bit register 33 is connected with the converters 35, 36, and 37. The adder 34 is connected with the encryptor 41 and the error detector 42. The converter 35 is connected with the memory 39. The converter 36 is connected with the register 40. The converter 37 is connected with the comparator 38. The comparator 38 leads to the information sending apparatus 10 via the transmission line 90. The memory 39 is connected with the encryptor 41. The register 40 is connected with the encryptor 41. The error detector 42 can be connected with a suitable apparatus such as a display apparatus, an information recording apparatus, or a player apparatus.

The information receiving apparatus 30 receives an information signal from the information sending apparatus 10 via the transmission line 90. The received signal is of a format in FIG. 3. The received signal is fed to the sync signal detector 31. The device 31 detects every horizontal sync signal and every vertical sync signal in the received signal. Each time a horizontal sync signal is detected, the sync signal detector 31 feeds the M sequence generator 32 and the 64-bit register 33 with a signal representing the detection of the horizontal sync signal. The signal representing the detection of the horizontal sync signal is referred to as the horizontal sync detection signal. Each time a vertical sync signal is detected, the sync signal detector 31 feeds the M sequence generator 32 and the 64-bit register 33 with a signal representing the detection of the vertical sync signal. The signal representing the detection of the vertical sync signal is referred to as the vertical sync detection signal. The sync signal detector 31 passes the received signal to the adder 34.

The sync signal detector 31 includes a circuit for detecting every frame-related or field-related initial vector signal 26 (see FIG. 3) in the received signal in response to every vertical sync signal and horizontal sync signals. Specifically, the detecting circuit starts counting horizontal sync signals in response to every vertical sync signal, and senses a horizontal sync signal, which immediately precedes a frame-related or field-related initial vector signal 26, on the basis of the count result. Thus, the detecting circuit senses a position indicator for a frame-related or field-related initial vector signal 26. The detecting circuit extracts the frame-related or field-related initial vector signal 26 from the received signal in response to the sensed horizontal sync signal (the sensed position indicator). The sync signal detector 31 feeds the extracted frame-related or field-related initial vector signal 26 to the comparator 38.

The structure of the M sequence generator 32 is the same as that of the M sequence generator 12 in the information sending apparatus 10. Thus, the M sequence generator 32 includes a linear feedback shift register (LFSR) 32A. During a blanking area (a blanking time area) after the moment of the reception of every vertical sync detection signal from the sync signal detector 31, the M sequence generator 32 normally continues to suspend a shifting action. Thus, the M sequence generator 32 normally suspends the shifting action synchronously with the detected vertical sync signal. After the blanking area, the M sequence generator 32 implements a 1-bit shift each time a horizontal sync detection signal comes from the sync signal detector 31. Thus, the M sequence generator 32 implements a 1-bit shift synchronously with the detected horizontal sync signal. At an initial stage, the M sequence generator 32 is in a standby state (an initial state) where the M sequence generator 32 or the LFSR 32A therein is loaded with a multi-bit signal representing a preliminarily-transmitted or predetermined initial value equal to that in the M sequence generator 12 of the information sending apparatus 10. In accordance with a set of bits held by the LFSR 32A, the M sequence generator 32 produces a maximum length sequence, that is, a multi-bit signal representing a pseudo random number. After the blanking area, the M sequence generator 32 implements a 1-bit shift and hence updates the pseudo random number signal each time a horizontal sync detection signal comes from the sync signal detector 31. The M sequence generator 32 outputs the pseudo random number signal to the 64-bit register 33.

The M sequence generator 32 includes a counter (a H sync counter) for counting every horizontal sync detection signal during the data area following the blanking area. The M sequence generator 32 includes a subtracter for, at the end of the present frame (or the present field), subtracting the horizontal sync count number from the normally total number of horizontal sync signals assigned to the data area in one frame (or one field). During the blanking area in the next frame (or the next field), the M sequence generator 32 implements a 1-bit shift a number of times which equals the result of the foregoing subtraction. Thus, the number of times the M sequence generator 32 implements a 1-bit shift can be corrected to the normal value which occurs in the absence of a failure to detect a horizontal sync signal or signals in the data area. Therefore, it is possible to compensate for a failure to detect a horizontal sync signal or signals in the data area.

The 64-bit register 33 samples and holds the output signal from the M sequence generator 32 and simultaneously feeds the held signal to the converters 35, 36, and 37 in response to every horizontal sync detection signal fed from the sync signal detector 31. The converter 35 changes the value represented by the signal fed from the 64-bit register 33 to a first value according to a first predetermined one way function. The converter 36 changes the value represented by the signal fed from the 64-bit register 33 to a second value according to a second predetermined one way function. The converter 37 changes the value represented by the signal fed from the 64-bit register 33 to a third value according to a third predetermined one way function. The first, second, and third values differ from each other.

The converters 35, 36, and 37 are the same in structure as the converters 15, 16, and 17 in the information sending apparatus 10, respectively. Therefore, when input signals to the converters 35 and 15 are the same, the converters 35 and 15 output equal conversion result signals. When input signals to the converters 36 and 16 are the same, the converters 36 and 16 output equal conversion result signals. When input signals to the converters 37 and 17 are the same, the converters 37 and 17 output equal conversion result signals.

The converter 35 feeds a signal representative of the first value (the conversion result) to the memory 39. The first-value signal is stored in the memory 39 as a signal representing an encryption key of the DES (Data Encryption Standard).

The signal fed from the 64-bit register 33 to the converter 37 which occurs at the moment of the reception of the final horizontal sync detection signal in the blanking area is specially handled as follows. The value represented by this signal is used as an authentication or certification value corresponding to that in the information sending apparatus 10 and is converted by the converter 37, and a signal representative of the conversion result value is fed from the converter 37 to the comparator 38 as a signal representative of a frame-related or field-related initial vector (initial value). In the absence of a transmission error or errors, the frame-related or field-related initial vector signal generated by the converter 37 is the same as the corresponding frame-related or field-related initial vector signal 26 outputted from the sync signal detector 31.

The device 38 compares the frame-related or field-related initial vector signal generated by the converter 37 and the frame-related or field-related initial vector signal outputted from the sync signal detector 31. Since the frame-related or field-related initial vector signal generated by the converter 37 originates from the authentication value (the certification value) in the information receiving apparatus 30 while the frame-related or field-related initial vector signal outputted from the sync signal detector 31 originates from the authentication value (the certification value) in the information sending apparatus 10, the device 38 substantially compares the authentication value in the information receiving apparatus 30 and the authentication value in the information sending apparatus 10. When the result of the comparison indicates that the frame-related or field-related initial vector signal generated by the converter 37 and the frame-related or field-related initial vector signal outputted from the sync signal detector 31 are the same (the two authentication values are equal), it is decided that encryption keys generated at a later stage will be equal to those used in the information sending apparatus 10. In this case, it is confirmed that the information sending apparatus 10 and the information receiving apparatus 30 have a same authentication value in common, or that encryption/decryption-related synchronization between the information sending apparatus 10 and the information receiving apparatus 30 is normally maintained. On the other hand, when the comparison result indicates that the two frame-related or field-related initial vector signals are not the same (the two authentication values are different), it is decided that encryption keys generated at a later stage will be different from those used in the information sending apparatus 10. In this case, the information sending apparatus 10 and the information receiving apparatus 30 are concluded to be out of the encryption/decryption-related synchronization, and the comparator 38 sends a signal representative of the comparison result toward the information sending apparatus 10 via the transmission line 90 as a fault indication signal. At the same time, the comparator 38 feeds the comparison result signal to the M sequence generator 32 which resets the M sequence generator 32 to its initial state.

The fault indication signal reaches the M sequence generator 12 in the information sending apparatus 10. The fault indication signal resets the M sequence generator 12 to its initial state.

In the case where the result of the comparison by the comparator 38 indicates that the two frame-related or field-related initial vector signals are the same, the information receiving apparatus 30 operates as mentioned below. The blanking area is followed by a data area interval assigned to the transmission of stream data. During the data area interval, the M sequence generator 32 implements a 1-bit shift and the signal fed from the 64-bit register 33 to the converter 36 changes in accordance with the 1-bit shift each time a horizontal sync detection signal comes from the sync signal detector 31. During the data area interval, the value represented by the signal fed from the 64-bit register 33 is converted by the converter 36, and a signal representative of the conversion result value is fed from the converter 36 to the register 40 as a signal representative of a 1H-related initial vector (initial value). The signal fed from the converter 36 is stored in the register 40.

The register 40, the encryptor 41, and the adder 34 compose an encryption circuit of the OFB (output feedback) mode. The signal representative of the 1H-related initial vector is fed from the register 40 to the encryptor 41 as a first word. The signal representative of the encryption key is fed from the memory 39 to the encryptor 41. The device 41 encrypts the first word in response to the encryption key. The encryptor 41 outputs the encryption result to the adder 34, and feeds the encryption result back to the register 40 as a second word. The register 40 stores the second word, and feeds the second word to the encryptor 41. The device 41 encrypts the second word in response to the encryption key. The encryptor 41 outputs the encryption result to the adder 34, and feeds the encryption result back to the register 40 as a third word. Such a sequence of operation steps is iterated until the data area interval terminates.

The structure of the encryption circuit of the OFB mode in the information receiving apparatus 30 is the same as that in the information sending apparatus 10. The information receiving apparatus 30 and the information sending apparatus 10 are synchronized in generating a 1H-related initial vector and an encryption key.

The adder 34 executes Exclusive-OR operation (XOR operation) between the received signal fed from the sync signal detector 31 and the output signal from the encryptor 41, and thereby decrypts the received signal in response to the output signal from the encryptor 41 to get a non-cipher signal inclusive of stream data and parity signals. The above-mentioned equal and synchronized relation between the information receiving apparatus 30 and the information sending apparatus 10 causes the non-cipher signal to be substantially the same as the input signal occurring before the encryption in the information sending apparatus 10. Thus, the received signal is decrypted into the original signal occurring in the information sending apparatus 10. The adder 34 feeds the non-cipher signal to the error detector 42. The error detector 42 subjects the stream data in the non-cipher signal to an error check responsive to the parity signals therein. The error detector 42 outputs the error-check-resultant stream data to a next stage including a suitable apparatus such as a display apparatus, an information recording apparatus, or a player apparatus.

For every frame or every field, a frame-related or field-related initial vector signal 26 is transmitted from the information sending apparatus 10 to the information receiving apparatus 30. For every frame or field, the information receiving apparatus 30 generates a frame-related or field-related initial vector signal corresponding to the transmitted one. The information receiving apparatus 30 compares the generated frame-related or field-related initial vector signal with the one actually received from the information sending apparatus 10, and thereby decides whether or not the two frame-related or field-related initial vector signals are the same. When the two frame-related or field-related initial vector signals are the same, the information receiving apparatus 30 confirms that encryption keys generated at a later stage will be equal to those used in the information sending apparatus 10 for every frame or field. In this case, the converters 35 and 36 are allowed to generate a 1H-related initial vector and an encryption key which are updated for every 1H interval in a data area. The generated 1H-related initial vector and the generated encryption key are equal to those used in the information sending apparatus 10. The 1H-related initial vector and the encryption key are inputted to the OFB-mode encryption circuit. Thus, for every 1H interval in the data area, the encryption result outputted from the encryptor 41 in the OFB-mode encryption circuit is updated and is equal to that outputted from the encryptor 20 in the information sending apparatus 10. Therefore, the non-cipher signal (the non-cipher data stream) generated through Exclusive-OR operation by the adder 34 in response to the encryption results from the encryptor 41 is equal to the original signal (the original data stream) which occurs before the encryption in the information sending apparatus 10.

As previously mentioned, the information receiving apparatus 30 counts each horizontal sync detection signal for the data area within every frame (or field). At the end of the present frame (or the present field), the horizontal sync count number is subtracted from the normally total number of horizontal sync signals assigned to the data area. During the blanking area in the next frame (or the next field), the M sequence generator 32 implements a 1-bit shift a number of times which equals the result of the foregoing subtraction. Thus, the number of times the M sequence generator 32 implements a 1-bit shift can be corrected to the normal value which occurs in the absence of a failure to detect a horizontal sync signal or signals in the data area. Therefore, it is possible to compensate for a failure to detect a horizontal sync signal or signals in the data area which would break the encryption/decryption-related synchronization between the information sending apparatus 10 and the information receiving apparatus 30.

In each of the information sending apparatus 10 and the information receiving apparatus 30, the 1H-related initial vector and the encryption key inputted to the OFB-mode encryption circuit are updated for every 1H interval. Therefore, it is possible to conceal transmitted information to a high degree.

Neither the periodically-updated 1H-related initial vector nor the periodically-updated encryption key is transmitted from the information sending apparatus 10 to the information receiving apparatus 30. The information sending apparatus 10 and the information receiving apparatus 30 generate the periodically-updated 1H-related initial vector and the periodically-updated encryption key while being synchronized. Thus, it is possible to prevent the occurrence of a drop in the transmission efficiency which would be caused by the transmission of the periodically-updated 1H-related initial vector and the periodically-updated encryption key. Furthermore, it is possible to reliably prevent the periodically-updated 1H-related initial vector and the periodically-updated encryption key from being stolen by an illegal attacker.

The frame-related or field-related initial vector signal 26 is used to check whether or not the information sending apparatus 10 and the information receiving apparatus 30 are normally synchronized regarding encryption and decryption. When the information sending apparatus 10 and the information receiving apparatus 30 are found to be out of the encryption/decryption-related synchronization, the M sequence generators 12 and 32 therein are initialized to restart the synchronizing procedure. Thus, the information transmission system is reliable, efficient, and inexpensive regarding encryption and decryption.

Second Embodiment

Figure 5:
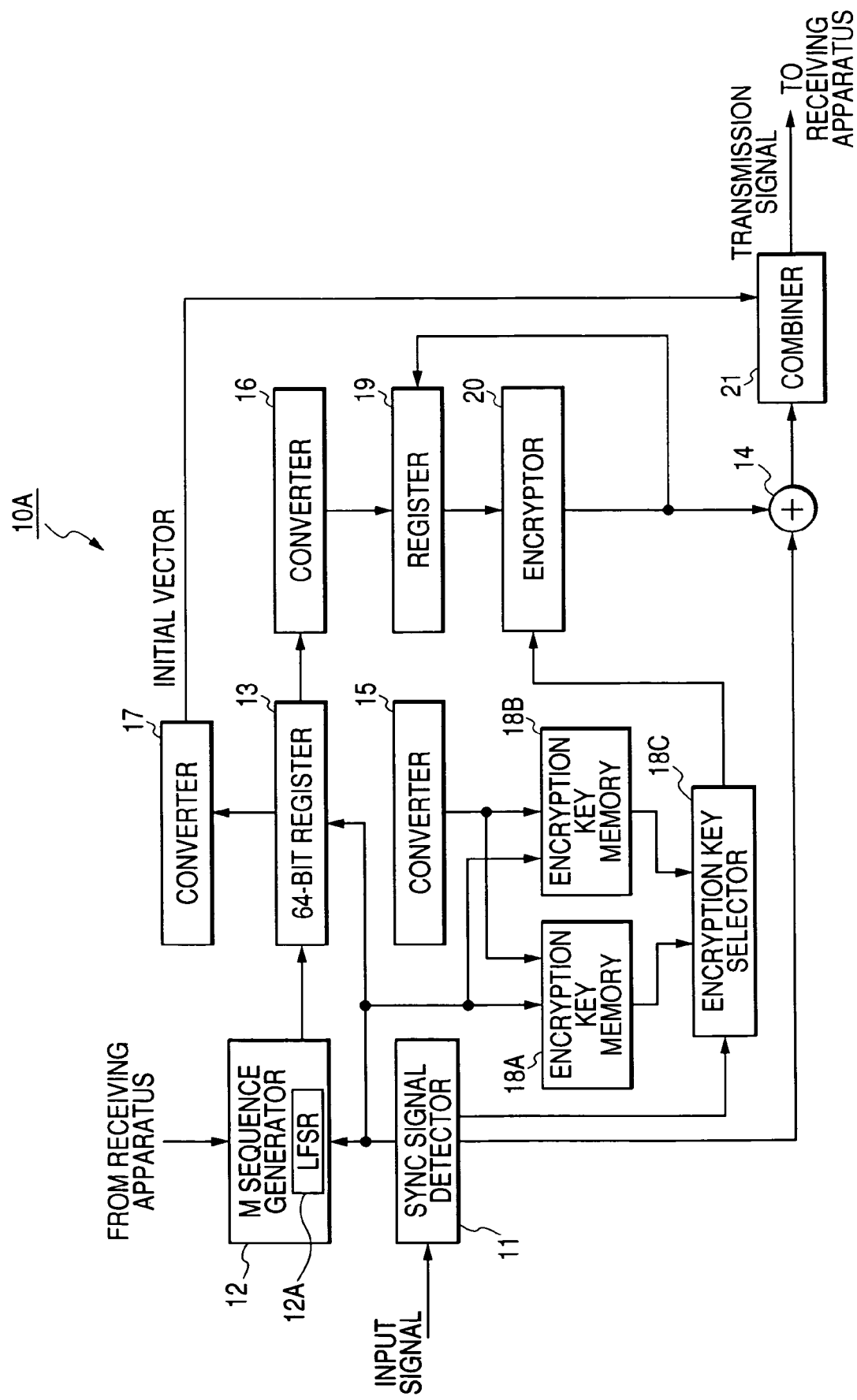
FIG. 5 is a block diagram of an information sending apparatus in a second embodiment of this invention.

FIG. 5 shows an information sending apparatus 10A in a second embodiment of this invention. The information sending apparatus 10A is similar to the information sending apparatus 10 (see FIG. 2) except for design changes mentioned hereafter.

As shown in FIG. 5, the information sending apparatus 10A includes a sync signal detector 11A, memories 18A and 18B, and a selector 18C. The sync signal detector 11A replaces the sync signal detector 11 in FIG. 2. The memories 18A and 18B are connected with the sync signal detector 11A, a converter 15, and the selector 18C. The selector 18C is connected with the sync signal detector 11A and an encryptor 20. The combination of the memories 18A and 18B, and the selector 18C replaces the memory 18 in FIG. 2.

An input signal fed to the sync signal detector 11A includes horizontal sync signals of two different types "A" and "B", that is, horizontal sync signals "A" and horizontal sync signals "B". The horizontal sync signals "A" differ from the horizontal sync signals "B" in pattern (bit sequence pattern). This structure of the input signal means that the horizontal sync signal therein changes between the type "A" and the type "B" as viewed in time domain.

The sync signal detector 11A is similar to the sync signal detector 11 (see FIG. 2) except that the sync signal detector 11A decides whether every detected horizontal sync signal in the input signal is of the type "A" or the type "B". The sync signal detector 11A outputs a signal representative of the result of the decision to the selector 18C. The sync signal detector 11A includes, for example, a pattern detector which discriminates between horizontal sync signals "A" and horizontal sync signals "B".

Each time a vertical sync signal in the input signal is detected, the sync signal detector 11A feeds a vertical sync detection signal to not only an M sequence generator 12 and a 64-bit register 13 but also the memories 18A and 18B.

As will be explained later, the memory 18A can be loaded with an output signal from the converter 15 which is handled as a signal representing an encryption key "A". Similarly, the memory 18B can be loaded with an output signal from the converter 15 which is handled as a signal representing an encryption key "B". The selector 18C accesses one of the memories 18A and 18B, and transfers the encryption-key signal from the accessed memory to the encryptor 20. In other words, the device 18C selects one from the signal representing the encryption key "A" and the signal representing the encryption key "B", and feeds the selected encryption-key signal to the encryptor 20. The encryptor 20 implements encryption in response to the encryption key represented by the signal fed from the selector 18C.

One of the memories 18A and 18B which is currently disconnected and released from the selector 18C can respond to a vertical sync detection signal fed from the sync signal detector 11A. The other memory, that is, the memory which is currently accessed by the selector 18C, can not respond to the vertical sync detection signal. Specifically, each time a vertical sync detection signal is fed from the sync signal detector 11A, one of the memories 18A and 18B which is currently disconnected and released from the selector 18C stores a first-value signal outputted by the converter 15. The stored first-value signal is an updated encryption-key signal or a new encryption-key signal. In this way, an encryption-key signal held in one of the memories 18A and 18B which is currently disconnected and released from the selector 18C is updated at a timing of the detection of a vertical sync signal. An encryption-key signal held in the other memory remains unchanged.

Every vertical sync signal in the input signal is followed by horizontal sync signals each being either a horizontal sync signal "A" or a horizontal sync signal "B", that is, each being of either the type "A" or the type "B". The selector 18C responds to the decision result signal outputted from the sync signal detector 11A. Specifically, when the decision result signal represents that a currently detected horizontal sync signal is of the type "A", the selector 18C accesses the memory 18A and transfers the encryption-key signal therefrom to the encryptor 20. On the other hand, when the decision result signal represents that a currently detected horizontal sync signal is of the type "B", the selector 18C accesses the memory 18B and transfers the encryption-key signal therefrom to the encryptor 20. The encryptor 20 implements encryption in response to the encryption key represented by the signal transferred from the selector 18C.

Once the selector 18C accesses the memory 18A, the selector 18C continues to transfer the encryption-key signal therefrom to the encryptor 20 until the decision result signal represents that a currently detected horizontal sync signal is of the type "B". Similarly, once the selector 18C accesses the memory 18B, the selector 18C continues to transfer the encryption-key signal therefrom to the encryptor 20 until the decision result signal represents that a currently detected horizontal sync signal is of the type "A".

In the case where the last horizontal sync signal in a frame is of the type "B", the memory 18B is accessed by the selector 18C and the memory 18A is disconnected and released therefrom so that the memory 18A stores the first-value signal outputted by the converter 15 in response to the detection of the vertical sync signal in the next frame. On the other hand, in the case where the last horizontal sync signal in a frame is of the type "A", the memory 18A is accessed by the selector 18C and the memory 18B is disconnected and released therefrom so that the memory 18B stores the first-value signal outputted by the converter 15 in response to the detection of the vertical sync signal in the next frame.

Normally, the first-value signal held in the memory 18A and the first-value signal held in the memory 18B, that is, the signal representative of the encryption key "A" and the signal representative of the encryption key "B", differ from each other in logic state. This means that the encryption key "A" and the encryption key "B" normally differ from each other.

The state of the selector 18C concerning a selective access to the memories 18A and 18B determines which of them stores a first-value signal outputted by the converter 15 in response to the detection of a vertical sync signal. Thus, the memories 18A and 18B store a first-value signal in a manner different from "alternate" one. Preferably, the change of the horizontal sync signal between the type "A" and the type "B" is irregular as viewed in time domain. Accordingly, the encryption key fed to the encryptor 20 changes irregular.

Figure 6:
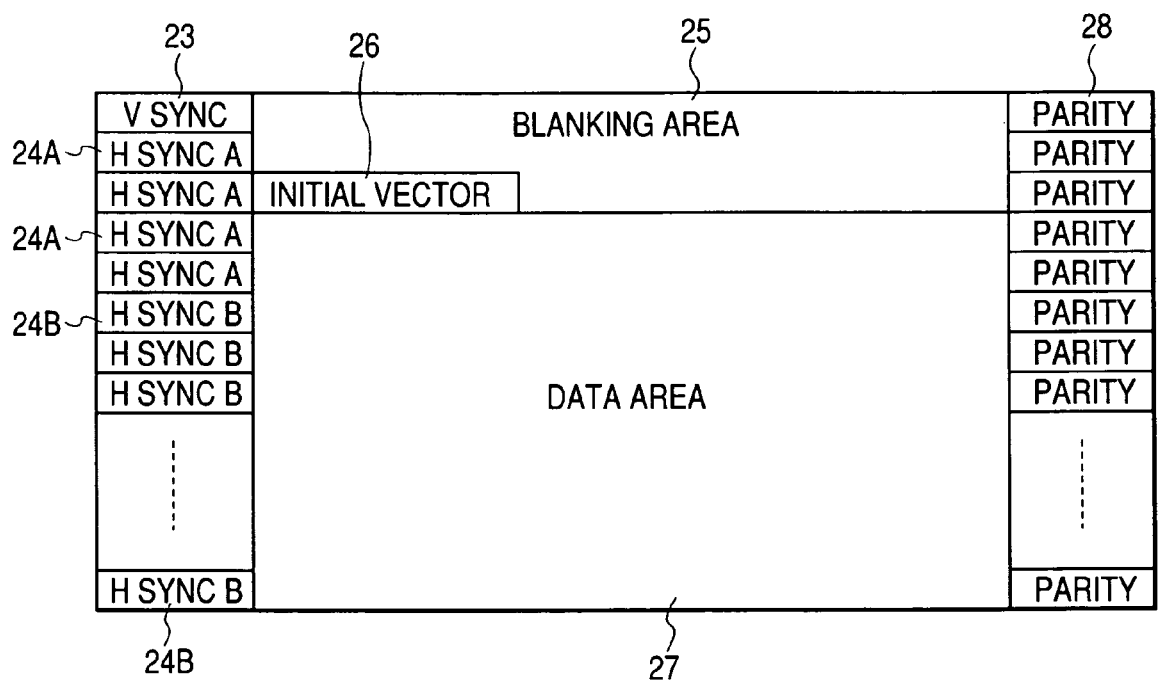
FIG. 6 is a diagram of the format taken by an information signal outputted from the information sending apparatus of FIG. 5.

FIG. 6 shows a format taken by every 1-frame corresponding portion (or every 1-field corresponding portion) of an information signal outputted from a combiner 21 in FIG. 5. FIG. 6 corresponds to FIG. 3. As shown in FIG. 6, the heads of 1H segments except the first one are occupied by horizontal sync signals 24A and 24B. The horizontal sync signals 24A in FIG. 6 mean horizontal sync signals "A" (horizontal sync signals of the type "A"). The horizontal sync signals 24B in FIG. 6 mean horizontal sync signals "B" (horizontal sync signals of the type "B"). For example, in one frame, former ones of the horizontal sync signals are of the type "A" while later ones thereof are of the type "B".

Figure 7:
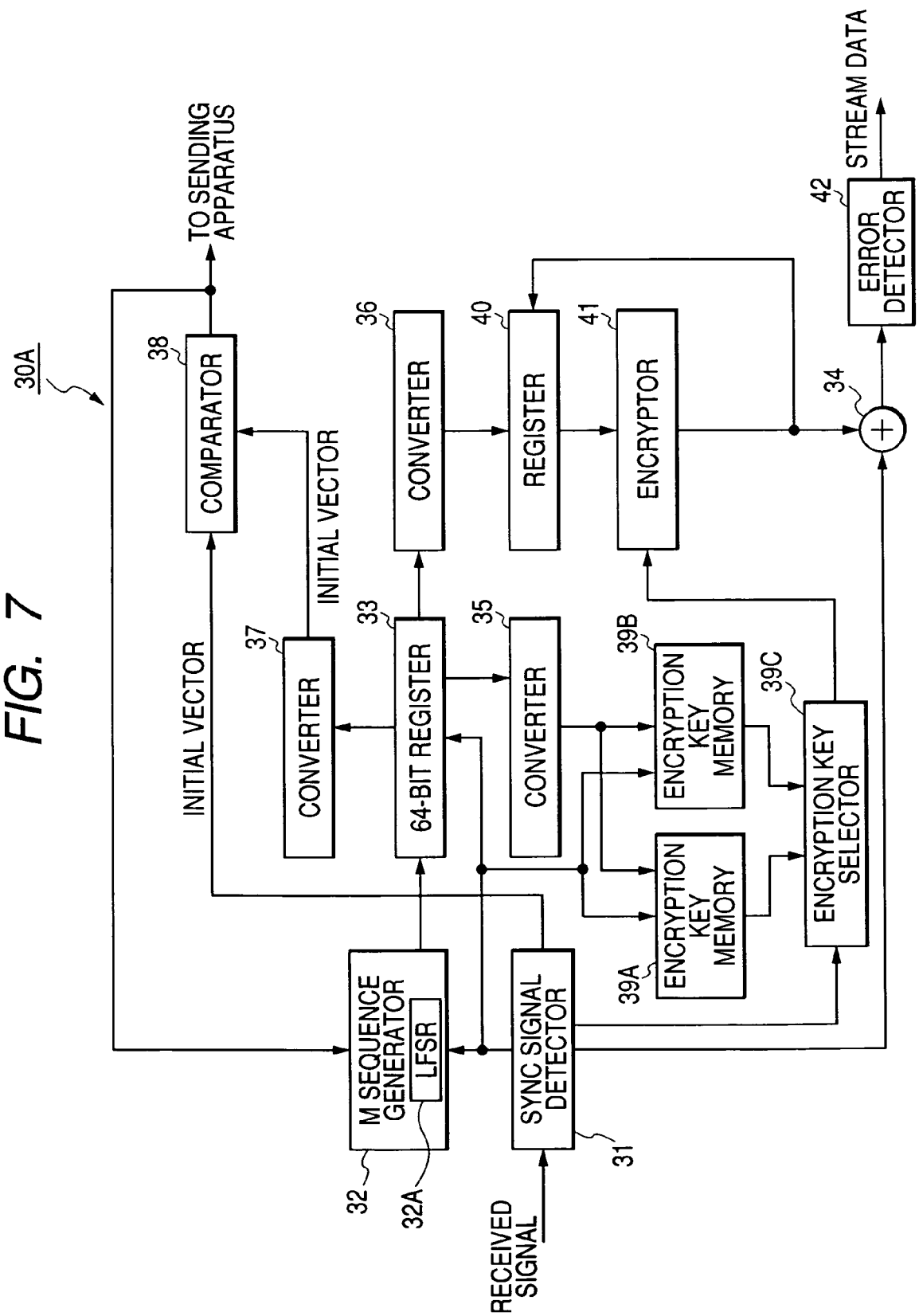
FIG. 7 is a block diagram of an information receiving apparatus in the second embodiment of this invention.

FIG. 7 shows an information receiving apparatus 30A in the second embodiment of this invention. The information receiving apparatus 30A is similar to the information receiving apparatus 30 (see FIG. 4) except for design changes mentioned hereafter.

As shown in FIG. 7, the information receiving apparatus 30A includes a sync signal detector 31A, memories 39A and 39B, and a selector 39C. The sync signal detector 31A replaces the sync signal detector 31 in FIG. 4. The memories 39A and 39B are connected with the sync signal detector 31A, a converter 35, and the selector 39C. The selector 39C is connected with the sync signal detector 31A and an encryptor 41. The combination of the memories 39A and 39B, and the selector 39C replaces the memory 39 in FIG. 4.

The information receiving apparatus 30A receives an information signal from the information sending apparatus 10A via a transmission line 90 (see FIG. 1). The received signal is of a format in FIG. 6. The received signal is fed to the sync signal detector 31A. The sync signal detector 31A is similar to the sync signal detector 31 (see FIG. 4) except that the sync signal detector 31A decides whether every detected horizontal sync signal in the received signal is of the type "A" or the type "B". The sync signal detector 31A outputs a signal representative of the result of the decision to the selector 39C. The sync signal detector 31A includes, for example, a pattern detector which discriminates between horizontal sync signals "A" and horizontal sync signals "B".

Each time a vertical sync signal in the received signal is detected, the sync signal detector 31A feeds a vertical sync detection signal to not only an M sequence generator 32 and a 64-bit register 33 but also the memories 39A and 39B.

The memory 39A is loaded with a signal representing an encryption key "A". The memory 39B is loaded with a signal representing an encryption key "B" generally different from the encryption key "A". The selector 39C accesses one of the memories 39A and 39B, and transfers the encryption-key signal from the accessed memory to the encryptor 41. In other words, the device 39C selects one from the signal representing the encryption key "A" and the signal representing the encryption key "B", and feeds the selected encryption-key signal to the encryptor 41. The encryptor 41 implements encryption in response to the encryption key represented by the signal fed from the selector 39C.

One of the memories 39A and 39B which is currently disconnected and released from the selector 39C can respond to a vertical sync detection signal fed from the sync signal detector 31A. The other memory, that is, the memory which is currently accessed by the selector 39C, can not respond to the vertical sync detection signal. Specifically, each time a vertical sync detection signal is fed from the sync signal detector 31A, one of the memories 39A and 39B which is currently disconnected and released from the selector 39C stores a first-value signal outputted by the converter 35. The stored first-value signal is an updated encryption-key signal or a new encryption-key signal. In this way, an encryption-key signal held in one of the memories 39A and 39B which is currently disconnected and released from the selector 39C is updated at a timing of the detection of a vertical sync signal. An encryption-key signal held in the other memory remains unchanged.

Every vertical sync signal in the received signal is followed by horizontal sync signals each being either a horizontal sync signal "A" or a horizontal sync signal "B", that is, each being of either the type "A" or the type "B". The selector 39C responds to the decision result signal outputted from the sync signal detector 31A. Specifically, when the decision result signal represents that a currently detected horizontal sync signal is of the type "A", the selector 39C accesses the memory 39A and transfers the encryption-key signal therefrom to the encryptor 41. On the other hand, when the decision result signal represents that a currently detected horizontal sync signal is of the type "B", the selector 39C accesses the memory 39B and transfers the encryption-key signal therefrom to the encryptor 41. The encryptor 41 implements encryption in response to the encryption key represented by the signal transferred from the selector 39C.

Once the selector 39C accesses the memory 39A, the selector 39C continues to transfer the encryption-key signal therefrom to the encryptor 41 until the decision result signal represents that a currently detected horizontal sync signal is of the type "B". Similarly, once the selector 39C accesses the memory 39B, the selector 39C continues to transfer the encryption-key signal therefrom to the encryptor 41 until the decision result signal represents that a currently detected horizontal sync signal is of the type "A".

In the case where the last horizontal sync signal in a frame is of the type "B", the memory 39B is accessed by the selector 39C and the memory 39A is disconnected and released therefrom so that the memory 39A stores the first-value signal outputted by the converter 35 in response to the detection of the vertical sync signal in the next frame. On the other hand, in the case where the last horizontal sync signal in a frame is of the type "A", the memory 39A is accessed by the selector 39C and the memory 39B is disconnected and released therefrom so that the memory 39B stores the first-value signal outputted by the converter 15 in response to the detection of the vertical sync signal in the next frame.

Third Embodiment

A third embodiment of this invention is similar to the second embodiment thereof except for design changes mentioned hereafter.

Figure 8:
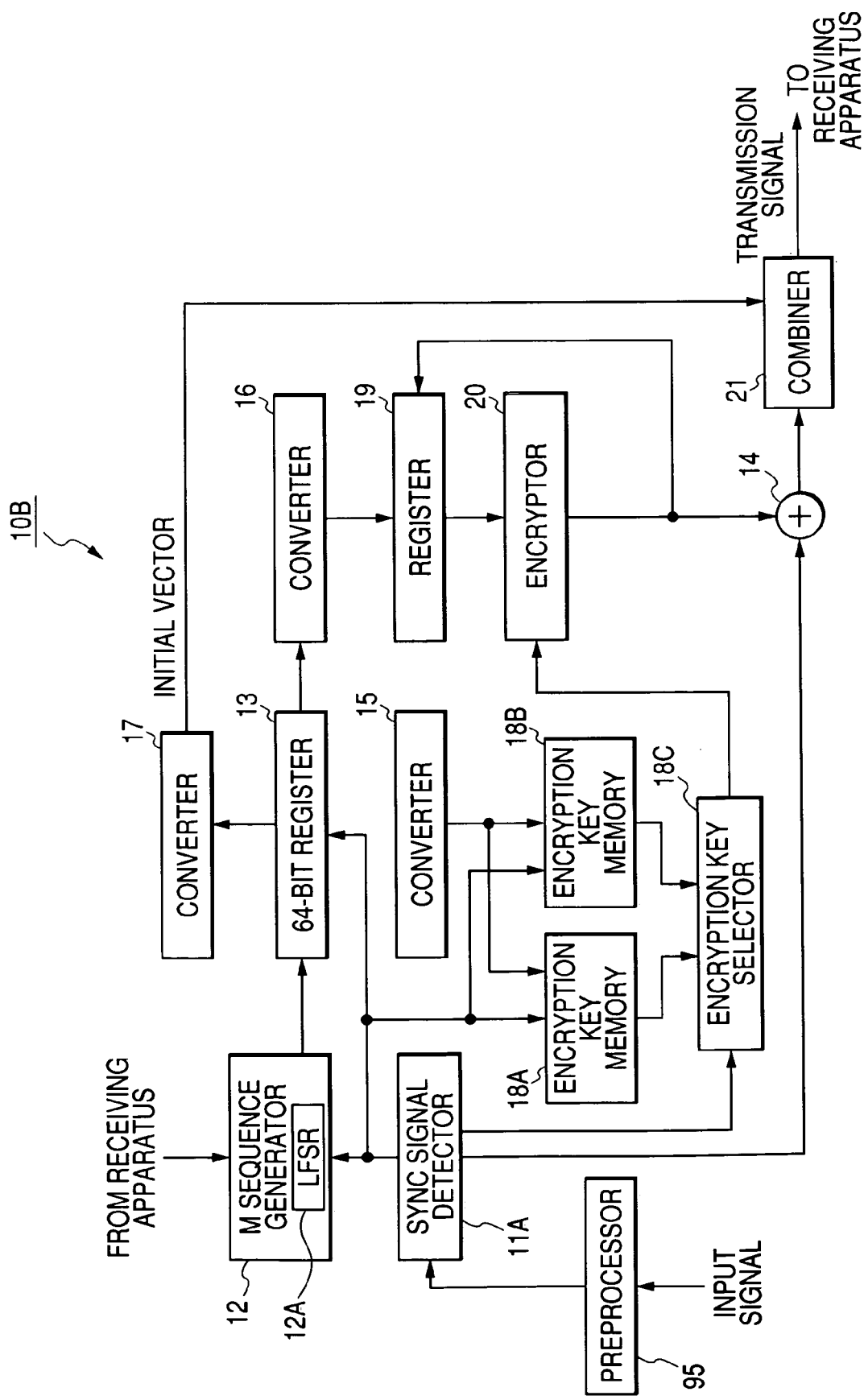
FIG. 8 is a block diagram of an information sending apparatus in a third embodiment of this invention.

FIG. 8 shows an information sending apparatus 10B in the third embodiment of this invention. The information sending apparatus 10B is similar to the information sending apparatus 10A (see FIG. 5) except that a preprocessor 95 is provided. As shown in FIG. 8, the preprocessor 95 is connected with a sync signal detector 11A.

The preprocessor 95 receives an input signal including horizontal sync signals, vertical sync signals, blanking signals, and stream data such as video data. Horizontal sync signals in the input signal are of only one type. The preprocessor 95 converts the input signal into a preprocessed signal including horizontal sync signals of two different types "A" and "B". The preprocessor 95 outputs the preprocessed signal to the sync signal detector 11A.

Figure 9:
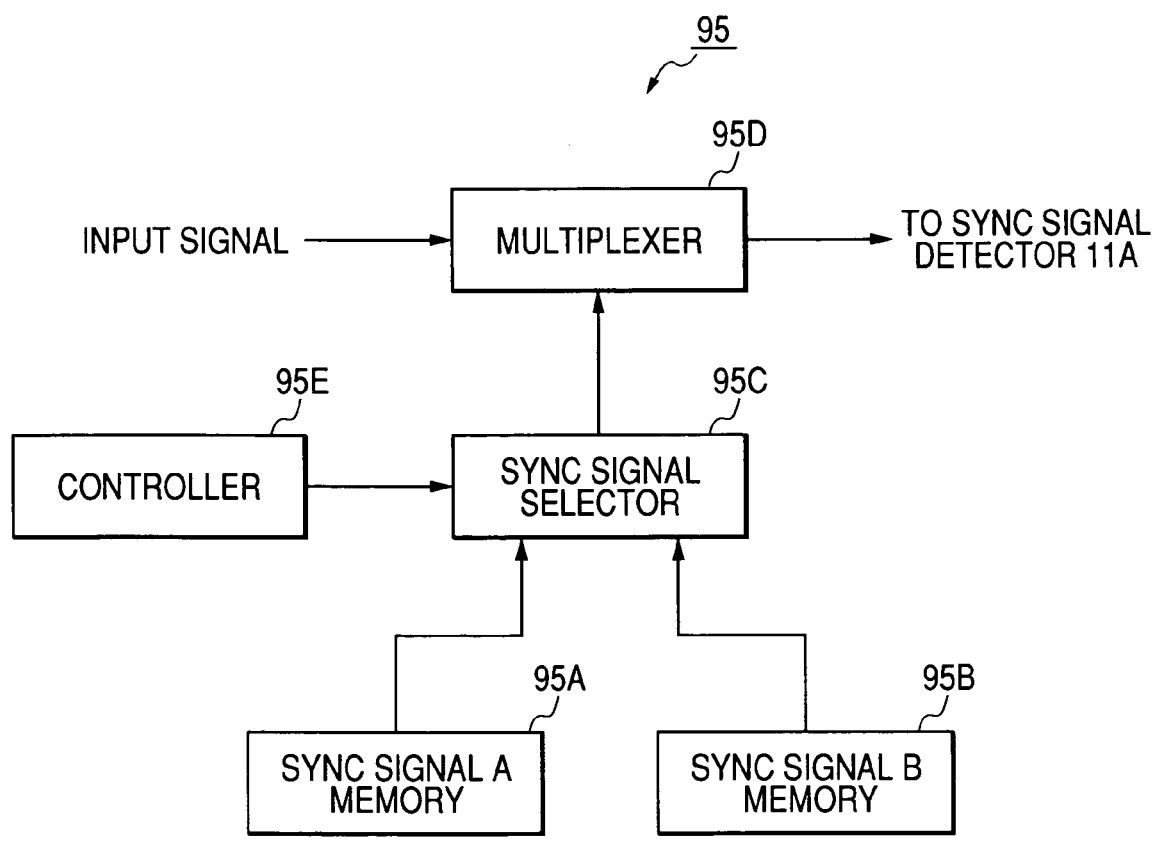
FIG. 9 is a block diagram of a preprocessor in FIG. 8.

As shown in FIG. 9, the preprocessor 95 includes memories 95A and 95B, a selector 95C, a multiplexer 95D, and a controller 95E. The memories 95A and 95B are connected with the selector 95C. The selector 95C is connected with the multiplexer 95D and the controller 95E. The multiplexer 95D receives the input signal. The multiplexer 95D is connected with the sync signal detector 11A.

The memory 95A stores the horizontal sync signal "A", that is, the horizontal sync signal of the type "A" which is a set of bits in a predetermined pattern "A". The memory 95B stores the horizontal sync signal "B", that is, the horizontal sync signal of the type "B" which is a set of bits in a predetermined pattern "B" different from the predetermined pattern "A". The selector 95C accesses one of the memories 95A and 95B, and transfers the horizontal sync signal from the accessed memory to the multiplexer 95D. Thus, the device 95C selects one from the horizontal sync signals "A" and "B", and transfers the selected horizontal sync signal to the multiplexer 95D.

The controller 95E generates a control signal. The controller 95E outputs the generated control signal to the selector 95C. The control signal determines which of the horizontal sync signals "A" and "B" the device 95C selects. The control signal is designed so that the device 95C will select one from the horizontal sync signals "A" and "B" irregularly or at random. Alternatively, the control signal may be designed so that the device 95C will select one from the horizontal sync signals "A" and "B" regularly.

As previously mentioned, the multiplexer 95D receives the input signal. The multiplexer 95D replaces every original horizontal sync signal in the input signal with one transferred from the selector 95C, and thereby converts the input signal into the preprocessed signal. The multiplexer 95D outputs the preprocessed signal to the sync signal detector 11A. The processed signal is equivalent to the input signal to the sync signal detector 11A in the second embodiment of this invention (FIG. 5).

The selector 95C and the multiplexer 95D are subjected to timing control responsive to a bit clock signal synchronous with the input signal. The bit clock signal is generated by a suitable device (not shown).

Fourth Embodiment

According to a fourth embodiment of this invention, the information sending apparatus and the information receiving apparatus in one of the first, second, and third embodiments of this invention are modified into an information recording apparatus and an information reproducing apparatus respectively.

Fifth Embodiment

A fifth embodiment of this invention is similar to one of the first, second, and third embodiments thereof except that the encryption circuit in each of the information sending apparatus and the information receiving apparatus is of a type different from the DES-OFB mode type. Specifically, the encryption circuit is of the ordinary DES type or another type.

Sixth Embodiment

A sixth embodiment of this invention is similar to one of the first, second, and third embodiments thereof except for design changes mentioned hereafter. According to the sixth embodiment of this invention, in each of the information sending apparatus and the information receiving apparatus, the encryption key is updated in response to an incoming vertical sync signal while the 1H-related initial vector is updated in response to an incoming horizontal sync signal.

What is claimed is:

1. An information transmission system comprising:
a sending apparatus for sending a composite signal including a first sync signal, a second sync signal, a first initial value, and encryption-resultant information, the first sync signal repetitively occurring at a first predetermined period, the second sync signal repetitively occurring at a second predetermined period shorter than the first predetermined period, wherein a plurality of the second sync signals are present in one period of the first sync signal in the composite signal;
a receiving apparatus for receiving the composite signal from the sending signal in the received apparatus, for detecting the first sync signal and the second sync composite signal, and for decrypting the encryption-resultant information in the received composite signal;
wherein the sending apparatus comprises:
first means for implementing a first shifting action synchronously with the second sync signal to generate a first pseudo random number signal, and for suspending the first shifting action synchronously with the first sync signal during a first prescribed time interval;
second means for generating the first initial value in response to the first pseudo random number signal generated by the first means;
third means separate from the second means for generating a second initial value in response to the first pseudo random number signal generated by the first means;
fourth means for generating a first encryption key in response to the first pseudo random number signal generated by the first means, the first encryption key being updated synchronously with the second sync signal;

fifth means for encrypting original information into the encryption-resultant information in response to the first encryption key generated by the fourth means and the second initial value generated by the third means;

sixth means for generating a combination-resultant signal inclusive of the first sync signal, the second sync signal, and the encryption-resultant information;

seventh means for adding the first initial value generated by the second means to the combination-resultant signal during the first prescribed time interval for which the first shifting action of the first means is suspended to get the composite signal;

wherein the receiving apparatus comprises:

eighth means for implementing a second shifting action, equal to the first shifting action, synchronously with the detected second sync signal to generate a second pseudo random number signal equal to the first pseudo random number signal, and for suspending the second shifting action synchronously with the detected first sync signal during a second prescribed time interval corresponding to the first prescribed time interval;

ninth means for generating a third initial value normally equal to the first initial value in response to the second pseudo random number signal generated by the eighth means;

tenth means separate from the ninth means for generating a fourth initial value equal to the second initial value in response to the second pseudo random number signal generated by the eighth means;

eleventh means for generating a second encryption key equal to the first encryption key in response to the second pseudo random number signal generated by the eighth means, the second encryption key being updated synchronously with the detected second sync signal;

twelfth means for detecting the first initial value in the received composite signal;

thirteenth means for comparing the first initial value detected by the twelfth means and the third initial value generated by the ninth means to check a synchronization between the sending apparatus and the receiving apparatus; and fourteenth means for decrypting the encryption-resultant information in the received composite signal in response to the second encryption key generated by the eleventh means and the fourth initial value generated by the tenth means.

2. An information transmission system as recited in claim 1, wherein the first sync signal comprises a vertical sync signal; the second sync signal comprises a horizontal sync signal; the first means comprises means for suspending the first shifting action during the first prescribed time interval including a first blanking area after the occurrence of the vertical sync signal, and means for implementing the first shifting action synchronously with the second sync signal during a first data area interval after the first blanking area to generate the first pseudo random number signal; the second means comprises means for generating the first initial value at a moment of the occurrence of the horizontal sync signal in the first blanking area; the third means comprises means for updating the second initial value synchronously with the second sync signal during the first data area interval; the fourth means comprises means for updating the first encryption key synchronously with the second sync signal during the first data area interval; the fifth means comprises means for encrypting the original information into the encryption-resultant information during the data area interval; the eighth means comprises means for suspending the second shifting action during the second prescribed time interval including a second blanking area after the occurrence of the detected vertical sync signal, and means for implementing the second shifting action synchronously with the detected second sync signal during a second data area interval after the second blanking area to generate the second pseudorandom number signal, the second blanking area corresponding to the first blanking area, the second data area interval corresponding to the first data area interval; the ninth means comprises means for generating the third initial value at a moment of the occurrence of the detected horizontal sync signal in the second blanking area; the tenth means comprises means for updating the fourth initial value synchronously with the detected second sync signal during the second data area interval; the eleventh means comprises means for updating the second encryption key synchronously with the detected second sync signal during the second data area interval;and the fourteenth means comprises means for decrypting the encryption-resultant information in the received composite signal during the second data area interval.

3. An information transmission system as recited in claim 1, wherein the composite signal has a data area interval occurring synchronously with the first sync signal and containing the encryption-resultant information, and the eighth means comprises means for detecting a total number of times the detected second sync signal occurs during the data area interval related to the received composite signal, means for subtracting the detected total number from a predetermined number to get a subtraction result, and means for implementing the second shifting action a number of times equal to the subtraction result during the next second prescribed time interval.

4. A method of transmitting cipher information from an information sending apparatus to an information receiving apparatus, the information sending apparatus including a first linear feedback shift register, the information receiving apparatus including a second linear feedback shift register equal in structure to the first linear feedback shift register, the method comprising the steps of:

loading the first linear feedback shift register and the second linear Feedback shift register with a same set of value-representing bits in common;

generating a first encryption key in response to value-representing bits held by the first linear feedback shift register;

encrypting an original video signal in response to the first encryption key to get a cipher video signal;

shifting a set of value-representing bits held by the first linear feedback shift register to update the first encryption key for every horizontal line represented by the original video signal in an effective scanning interval related thereto;

using a value represented by value-representing bits held by the first Linear feedback shift register at a first timing of a prescribed horizontal line in every 1-frame interval or every 1-field interval related to the original video signal as a first authentication value;

combining the cipher video signal and the first authentication value to get a composite signal inclusive of the cipher video signal and the first authentication transmitting the composite signal from the information sending apparatus to the information receiving apparatus;

generating a second encryption key equal to the first encryption key in response to value-representing bits held by the second linear feedback shift register;

shifting a set of value-representing bits held by the second linear feedback shift register to update the second encryption key in accordance with the updating of the first encryption key;

decrypting the cipher video signal in the composite signal transmitted from the information sending apparatus in response to the second encryption key to recover the original video signal in the information receiving apparatus;

using a value represented by value-representing bits held by the second linear feedback shift register at a second timing corresponding to the first timing as a second authentication value;

detecting the first authentication value in the composite signal transmitted from the information sending apparatus; and checking whether or not the information sending apparatus and the information receiving apparatus have a same authentication value in common in response to the detected first authentication value and the second authentication value for every frame or every field.

5. A method as recited in claim 4, further comprising the steps of:

detecting a total number of times a set of value-representing bits held by the second linear feedback shift register is shifted during a predetermined later time area in every frame or every field;

subtracting the detected total number from a predetermined number to get a subtraction result; and shifting a set of value-representing bits held by the second linear feedback shift register a number of times equal to the subtraction result during a predetermined former time area in the next frame or the next field.

6. A method as recited in claim 4, wherein the checking step comprises deciding whether the detected first authentication value and the second authentication value are equal or different to check whether or not the information sending apparatus and the information receiving apparatus have a same authentication value in common, and further comprising the step of reloading the first linear feedback shift register and the second linear feedback shift register with the same set of value-representing bits in common when it is decided that the detected first authentication value and the second authentication value are different.

7. A method as recited in claim 4, wherein the checking step comprises comparing the detected first authentication value and the second authentication value to check whether or not the information sending apparatus and the information receiving apparatus have a same authentication value in common.

8. An information transmission system comprising:

a first linear feedback shift register holding a multi-bit signal and outputting the held multi-bit signal;

first means for driving the first linear feedback shift register to implement a bit shift of the multi-bit signal held by the first linear feedback shift register and thereby updating the multi-bit signal outputted therefrom in response to every horizontal sync signal in an input video signal during a predetermined data area of every frame or field represented by the input video signal;

second means for encrypting video data in the input video signal in response to the multi-bit signal outputted from the first linear feedback shift register to change the input video signal into a first cipher video signal;

third means for generating a first initial vector signal in response to the multi-bit signal which is outputted from the first linear feedback shift register at a prescribed timing relative to every frame or field represented by the input video signal;

fourth means for combining the first cipher video signal and the first initial vector signal into a second cipher video signal, and outputting the second cipher video signal;

a second linear feedback shift register holding a multi-bit signal and outputting the held multi-bit signal;

fifth means for receiving the second cipher video signal outputted from the fourth means, and detecting every horizontal sync signal in the received second cipher video signal;

sixth means for driving the second linear feedback shift register to implement a bit shift of the multi-bit signal held by the second linear feedback shift register and thereby updating the multi-bit signal outputted therefrom in response to every horizontal sync signal detected by the fifth means during the predetermined data area of every frame or field represented by the received second cipher video signal;

seventh means for decrypting video data in the received second cipher video signal in response to the multi-bit signal outputted from the second linear feedback shift register to reproduce the input video signal;

eighth means for generating a second initial vector signal in response to the multi-bit signal which is outputted from the second linear feedback shift register at the prescribed timing relative to every frame or field represented by the received second cipher video signal;

ninth means for detecting the first initial vector signal in the received second cipher video signal;

tenth means for deciding whether the detected first initial vector signal and the generated second initial vector signal are equal or different; and eleventh means for, when the tenth means decides that the detected first initial vector signal and the generated second initial vector signal are different, synchronously resetting the first and second linear feedback shift registers to their initial states in which the first and second linear feedback shift registers hold and output a same predetermined initial multi-bit signal.

9. An information transmission system as recited in claim 8, wherein the sixth means comprises means for compensating for a failure to detect a horizontal sync signal or signals in the fifth means during the predetermined data area of every frame or field represented by the received second cipher video signal.

10. An information transmission system comprising:

a sending apparatus for encrypting an input information signal into an encryption-resultant information signal, and for sending the encryption-resultant information signal, wherein the input information signal contains a plurality of different types of horizontal sync signals; and a receiving apparatus for receiving the encryption-resultant information signal from the sending apparatus, and for decrypting the received encryption-resultant information signal;

wherein the sending apparatus comprises:

first means for generating an encryption key depending on the type of current one of the horizontal sync signals in the input information signal; and second means for encrypting the input information signal in response to the encryption key generated by the first means to get the encryption-resultant information signal; and wherein the receiving apparatus comprises:

third means for detecting the type of current one of the horizontal sync signals in the received encryption-resultant information signal;

fourth means for generating a decryption key depending on the type detected by the third means; and fifth means for decrypting the received encryption-resultant information signal in response to the decryption key generated by the fourth means.

11. An information sending apparatus comprising:

a first memory storing a first encryption key;

a second memory storing a second encryption key different from the first encryption key;

first means for detecting every horizontal sync signal of either a first type or a second type in an input information signal, the first and second types differing from each other;

second means for deciding whether the horizontal sync signal detected by the first means is of the first type or the second type;

a selector for accessing the first memory to select the first encryption key when the second means decides that the horizontal sync signal detected by the first means is of the first type, and for accessing the second memory to select the second encryption key when the second means decides that the horizontal sync signal detected by the first means is of the second type, wherein the selector continues to access the first memory until the second means decides that the horizontal sync signal detected by the first means is of the second type, and continues to access the second memory until the second means decides that the horizontal sync signal detected by the first means is of the first type;

third means for encrypting the input information signal in response to the encryption key selected by the selector;

fourth means for detecting every vertical sync signal in the input information signal; and fifth means for updating the encryption key in one of the first and second memories which is not accessed by the selector each time the fourth means detects a vertical sync signal in the input information signal.

12. An information sending apparatus as recited in claim 11, further comprising sixth means for replacing horizontal sync signals in an original information signal with horizontal sync signals of the first and second types to convert the original information signal into the input information signal.

13. An information receiving apparatus comprising:

a first memory storing a first encryption key;

a second memory storing a second encryption key different from the first encryption key;

first means for detecting every horizontal sync signal of either a first type or a second type in a received information signal, the first and second types differing from each other;

second means for deciding whether the horizontal sync signal detected by the first means is of the first type or the second type;

a selector for accessing the first memory to select the first encryption key when the second means decides that the horizontal sync signal detected by the first means is of the first type, and for accessing the second memory to select the second encryption key when the second means decides that the horizontal sync signal detected by the first means is of the second type, wherein the selector continues to access the first memory until the second means decides that the horizontal sync signal detected by the first means is of the second type, and continues to access the second memory until the second means decides that the horizontal sync signal detected by the first means is of the first type;

third means for decrypting the received information signal in response to the encryption key selected by the selector;

fourth means for detecting every vertical sync signal in the received information signal; and fifth means for updating the encryption key in one of the first and second memories which is not accessed by the selector each time the fourth means detects a vertical sync signal in the received information signal.

14. An information transmission system as recited in claim 1, wherein the firstsync signal is a vertical sync signal and the second sync signal is a horizontal sync signal, and the first prescribed time interval is a blanking time area so that the seventhmeans adds the first initial value generated by the second means to the combination-resultant signal during the blanking time area, wherein the first means includes a maximum length sequence generator (12) for generating the first pseudo random number signal, and the second means includes a converter (17) for changing the first pseudo random number signal into the first initial value, and wherein the seventhmeans includes means for adding the first initial value generated by the converter (17)to the combination-resultant signal at a time position following the time position of final one among horizontal sync signals in the blanking time area.

* * * * *